United States Patent
Iakovlev

(10) Patent No.: US 9,953,104 B2
(45) Date of Patent: Apr. 24, 2018

(54) CONTROLLING ACCESS TO ONE OR MORE DATASETS OF AN OPERATING SYSTEM IN USE

(71) Applicant: International Business Machines Corporation, Armonk, NY (US)

(72) Inventor: Andrei Iakovlev, Olivet (FR)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 14/307,596

(22) Filed: Jun. 18, 2014

(65) Prior Publication Data
US 2015/0006580 A1    Jan. 1, 2015

(30) Foreign Application Priority Data
Jul. 1, 2013 (GB) .................................. 1311727.0

(51) Int. Cl.
*G06F 17/30* (2006.01)
*G06F 21/62* (2013.01)

(52) U.S. Cl.
CPC .... *G06F 17/30952* (2013.01); *G06F 21/6281* (2013.01); *G06F 2221/2141* (2013.01)

(58) Field of Classification Search
None
See application file for complete search history.

(56) References Cited

U.S. PATENT DOCUMENTS

| 7,814,554 B1 | 10/2010 | Ragner |
| 8,250,350 B2 | 8/2012 | John et al. |
| 8,250,648 B2 | 8/2012 | Kabzinski et al. |

(Continued)

FOREIGN PATENT DOCUMENTS

| CN | 101727545 | 6/2010 |
| KR | 20090107035 | 10/2009 |

(Continued)

OTHER PUBLICATIONS

Robert N. M. Watson, New Approaches to operating system security extensibility, Technical Report, No. 818, UCAM-CL-TR-818, ISSN 1476-2986, Apr. 2012, 183 pages.

(Continued)

*Primary Examiner* — Christopher J Raab
(74) *Attorney, Agent, or Firm* — Schmeiser, Olsen & Watts, LLP; John Pivnichny

(57) ABSTRACT

A method and system for controlling access to data. Each dataset of L datasets is stored, via storage access controller (SAC) software external to an operating system, on at least one physical storage device. Each dataset is independently accessible in accordance with an access permission type assigned to each dataset independently selected for each dataset from N unique access permission types. $N \geq 2$ and $L \geq N$. Control of access to each dataset stored on the at least one physical storage device is configured to enforce, via the SAC, access to each dataset in accordance with the access permission type assigned to each dataset. The operating system is unable to provide the control of access to each dataset to which access is enforced by the SAC in accordance with the access permission type assigned to each dataset and which is stored on the at least one physical storage device.

20 Claims, 6 Drawing Sheets

(56) References Cited

U.S. PATENT DOCUMENTS

| | | | |
|---|---|---|---|
| 8,296,320 B1 * | 10/2012 | Corbett | ............... G06F 21/6218 707/781 |
| 9,251,114 B1 * | 2/2016 | Ancin | ............... G06F 15/17331 |
| 2003/0028508 A1 * | 2/2003 | Quinlan | ................. G06F 21/31 |
| 2004/0078568 A1 | 4/2004 | Pham et al. | |
| 2006/0129627 A1 | 6/2006 | Phillips et al. | |
| 2006/0218637 A1 * | 9/2006 | Thomas | ................. G06F 21/51 726/23 |
| 2007/0112772 A1 | 5/2007 | Morgan et al. | |
| 2007/0113266 A1 | 5/2007 | Ross et al. | |
| 2008/0104348 A1 * | 5/2008 | Kabzinski | ............... G06F 21/78 711/164 |
| 2008/0163382 A1 * | 7/2008 | Blue | ......................... G06F 8/31 726/28 |
| 2011/0153697 A1 * | 6/2011 | Nickolov | .............. G06F 9/4856 707/827 |
| 2012/0255004 A1 | 10/2012 | Sallam | |
| 2012/0255010 A1 | 10/2012 | Sallam | |
| 2012/0255016 A1 | 10/2012 | Sallam | |
| 2012/0255031 A1 | 10/2012 | Sallam | |

FOREIGN PATENT DOCUMENTS

| | | |
|---|---|---|
| WO | WO2007099012 | 9/2007 |
| WO | WO2011076464 | 6/2011 |
| WO | WO2012135192 | 10/2012 |

OTHER PUBLICATIONS

Kim et al., A Security Architecture for Adapting Multiple Access Control Models to Operating Systems, M. Gavrilova et al. (Eds.): ICCSA 2006, LNCS 3984, pp. 922-931, copyright Springer-Verlag Berlin Heidelberg.

IBM Cognos 8 Business Intelligence Architecture and Deployment Guide Securing the Deployment, Techniques for Securing the Operating System, Retrieved from internet: <http://publib.boulder.ibm.com/infocenter/c8bi/v8r4m0/index.jsp?topic=/com.ibm.swg.im.cognos.crn_arch.8.4.0.doc/crn_arc_id4272Securing_the_Operating_System.html>, 4 pages, Nov. 27, 2009 (last updated).

Dewan et al., A Hypervisor-Based System for Protecting Software Runtime Memory and Persistent Storage, 2008 Spring Sim, 1-56555-319-5, pp. 828-835.

\* cited by examiner

| Filename | Path | Access Permissions | Logical Storage Device |
|---|---|---|---|
| Password1 | /etc/password1 | Read only (ro) | /dev/lSD1 |
| Syslog | /log/syslog | Write once (w1) | /dev/lSD2 |
| Ls.1 | /man/ls.1 | Read/write (r/w) | /dev/lSD3 |
| Trans | /transactions/trans | Write only (wo) | /dev/lSD4 |

Figure 2

CONTROLLING ACCESS TO ONE OR MORE DATASETS OF AN OPERATING SYSTEM IN USE

TECHNICAL FIELD

The present invention relates to controlling access to one or more datasets of an operating system in use.

BACKGROUND

Computer systems run operating systems in which users are commonly provided with differing levels of access permissions or privileges. The access permissions are arranged to enable the activities of a given user to be restricted where appropriate. For example, a normal user of a computer system may have relatively restricted access permissions, which limit the user's ability to use, modify or create selected sets of data. An administrator of the computer system may, by contrast, have access permissions that enable the administrator to use, modify or create any data within the computer system. Hierarchies of access permissions may be provided. Access permissions commonly relate to reading or writing datasets in the form of computer files. Access permissions may also be referred to as user rights or privileges. In many computer systems, full access permissions are reserved for trusted computer system administrator user accounts commonly referred to as a superuser, privileged, root or supervisor accounts.

Maintaining the security or integrity of a computer system is problematic when an administrator account is compromised or an unauthorized administrator account is created. Such accounts can be used to access, create or modify computer system data so as to compromise the security and integrity of the computer system. In particular, security related data or sensitive user data could be accessed or modified.

BRIEF SUMMARY

The present invention provides a method, and associated computer program product and computer system, for controlling access to data. The method comprises:

storing, by a processor of a computer system, via execution of a storage access controller (SAC), each dataset of L datasets on at least one physical storage device, wherein each dataset is independently accessible in accordance with an access permission type assigned to each dataset independently selected for each dataset from N unique access permission types, wherein N is at least 2 and L≥N, and wherein the SAC is software within the computer system and is external to an operating system of the computer system; and after said storing, configuring in the SAC control of access to each dataset stored on the at least one physical storage device, said control of access configured to enforce, by the SAC, access to each dataset in accordance with the access permission type assigned to each dataset, wherein the operating system is unable to provide the control of access to each dataset to which access is enforced by the SAC in accordance with the access permission type assigned to each dataset and which is stored on the at least one physical storage device.

BRIEF DESCRIPTION OF THE DRAWINGS

FIG. 2 is a table of data used by the installer of FIG. 1, in accordance with embodiments of the present invention.

DETAILED DESCRIPTION

Figure 1:
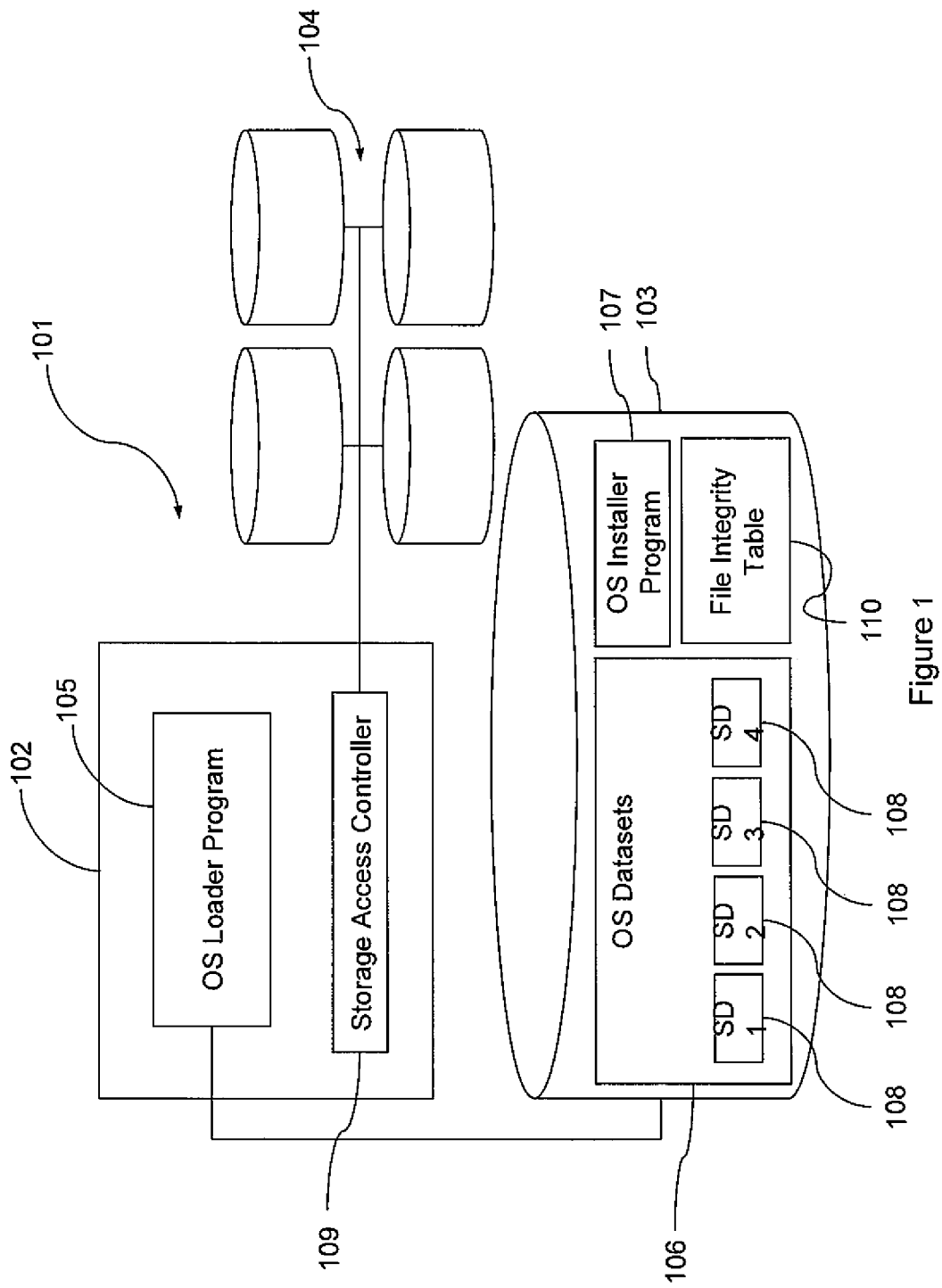
FIG. 1 is a schematic illustration of a computer system comprising a storage access controller and an operating system installer arranged to install an operating system, in accordance with embodiments of the present invention.

An embodiment of the invention provides apparatus for configuring an operating system on a programmable device for controlling access to one or more datasets of the operating system in use, the apparatus comprising a processor operable to: identify an operating system for running on a programmable device; identify a dataset for the operating system, the dataset having associated access permissions; select a storage device for storing the identified dataset; store the identified dataset on the selected storage device; and configure access control to the identified dataset when stored on the selected storage device, so that the access control is operable to enforce the associated access permissions for the dataset in response an access request for the dataset from the operating system in use, the access control being provided externally to the operating system.

Embodiments of the invention enable the control of access to selected datasets, such as OS critical resources, perhaps comprising security related data, to be performed externally to the OS. In the event of the OS being compromised at a user level capable of overriding access permissions within the OS, the access permissions for the critical resources of the OS are more likely to remain secure or to resist unauthorized alteration or overriding.

The access control may be functionally isolated from the operating system. The dataset may comprise data related to the security of the operating system. The dataset may comprise data normally reserved for unrestricted access solely by a higher privileged user group of the operating system. The access permissions may be enforced on requests for access to the dataset by only allowing access to the storage device if the request complies with the respective access permissions.

A plurality of datasets may be identified, each dataset having respective access permissions. The access permissions may comprise a plurality of types and storage devices are provided for storing the datasets having access permissions of corresponding types. The or each identified dataset may be at least partially predetermined for the operating system. The storage devices may be logical storage devices provided within the operating system. The storage devices may be physical storage devices.

Another embodiment provides apparatus for use externally to an operating system for managing requests from the operating system for access to a dataset having restricted access permissions, the apparatus being operable to: receive externally to an operating system a request for access by the operating system to a dataset of the operating system, the dataset having associated access permissions; comparing the request for access to the dataset to the access permissions for the dataset; and allow the request only if the request is compatible with the access permissions.

A further embodiment provides a method for configuring an operating system on a programmable device for controlling access to one or more datasets of the operating system in use, the method comprising the steps of: identifying an operating system for running on a programmable device; identifying a dataset for the operating system, the dataset having associated access permissions; selecting a storage device for storing the identified dataset; storing the identified dataset on the selected storage device; and configuring access control to the identified dataset when stored on the selected storage device, the access control being arranged to enforce the associated access permissions for the dataset in response an access request for the dataset from the operating system in use, the access control being provided externally to the operating system.

Another embodiment provides method for use externally to an operating system for managing requests from the operating system for access to a dataset having restricted access permissions, the method comprising the steps of: receiving externally to an operating system a request for access by the operating system to a dataset of the operating system, the dataset having associated access permissions; comparing the request for access to the dataset to the access permissions for the dataset; and allowing the request only if the request is compatible with the access permissions.

A further embodiment provides a computer program stored on a computer readable medium and loadable into the internal memory of a digital computer, comprising software code portions, when said program is run on a computer, for performing a method for configuring an operating system on a programmable device for controlling access to one or more datasets of the operating system in use, the method comprising the steps of: identifying an operating system for running on a programmable device; identifying a dataset for the operating system, the dataset having associated access permissions; selecting a storage device for storing the identified dataset; storing the identified dataset on the selected storage device; and configuring access control to the identified dataset when stored on the selected storage device, the access control being arranged to enforce the associated access permissions for the dataset in response an access request for the dataset from the operating system in use, the access control being provided externally to the operating system.

With reference to FIG. 1, a computer system 101 comprises a computer 102 connected to a first storage device 103 and a set of second storage devices 104, in accordance with embodiments of the present invention. The computer 102 is loaded with an operating system (OS) loader program 105 arranged to run natively on the hardware of the computer 102 and provides the functionality for loading and launching executable code, such as an operating system (OS) or OS installer program on the computer 102.

In the present embodiment the first storage device 103 comprises operating system (OS) datasets 106 and an OS installer program 107. The OS installer program 107 is arranged to an operational OS on the computer 102 using the OS datasets 106. In the present embodiment, the OS datasets 106 comprise four datasets 108 that hold data relevant to the security or integrity of the OS when installed and in use. The four datasets 108 each have respective associated access permissions (not shown) with respect to reading from or writing to the datasets 108 by the highest-level user of the OS.

The computer 102 is also loaded with a storage access controller (SAC) 109 arranged, in the present embodiment, to run natively on the hardware of the computer 102. The SAC 109 is arranged to control access to data stored on the set of second storage devices 104 by the OS when installed and running on the computer 102.

The first storage device 103 further comprises a file integrity table (FIT) 110, which comprises an identification of each of the critical datasets 108 described above. With reference to FIG. 2, in the present embodiment, the FIT 110 comprises an entry 201 for each of the predetermined critical datasets 108, in accordance with embodiments of the present invention. In the present embodiment, each entry 201 comprises the filename 202 and pathname 203 for identifying the relevant datasets 108 within the OS datasets 106. Each entry 201 further identifies the relevant access permissions 204 for the relevant dataset 108. In the present embodiment, the access permissions comprise read only (ro), write once (w1), read/write (rw) and write only (wo). In the present embodiment, each entry 201 also comprises a logical storage device identifier 205 associated with the given dataset 108. In the present embodiment, one logical storage device is provided for each type of access permission. In other words each dataset 108 is assigned to a logical storage device in dependence on the access permissions associated with the dataset 108. For example, the two entries in the FIT 110 may identify datasets with read only access permissions 204 and are both assigned the same logical storage device identifier 205.

In the present embodiment, the contents of the FIT 110 are provided by the provider or author of the OS datasets 106 so as to identify at least a subset of the critical datasets 108 to the administrator installing the OS onto the computer 102. In the present embodiment, the FIT 110 may be edited by the administrator so as to add, remove or modify entries 201 as required.

Figure 3:
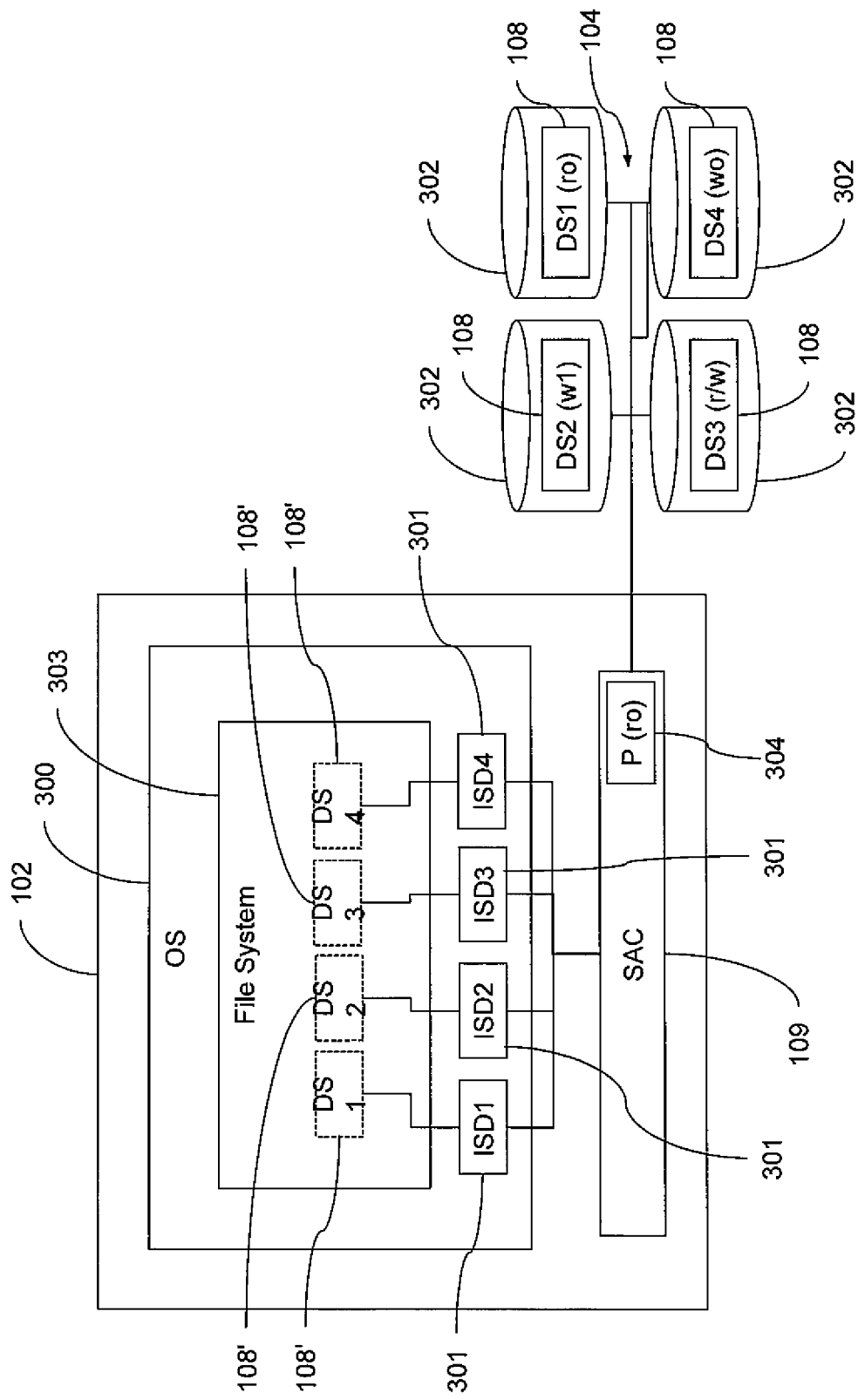
FIG. 3 is a schematic illustration of the computer system of FIG. 1 with the operating system installed, in accordance with embodiments of the present invention.

The FIT 110 is arranged for use by the OS installer 107 when loading the OS datasets 106, to identify the critical datasets 108. The OS installer 107 is then arranged to set up the computer 102 so that access to the critical datasets 108 is enforced externally to the operational OS by the SAC 109 and in accordance with the respective access permissions. With reference to FIG. 3, the OS installer 107 is arranged to install the OS datasets 106 on the computer 102 to provide an operational OS 300, in accordance with embodiments of the present invention. Once loaded, the OS installer 107 creates a set of logical storage devices 301 corresponding to each identifier 205 in the FIT 110. As noted above, each identifier 205 is associated with one type of access permissions. The OS installer 107 also selects a set of physical storage devices 302, on the basis of the interface provided to the physical storage 104 via the SAC 109, that corresponds to the set of logical storage devices 301. Thus, in the present embodiment, each physical device 302 corresponds to a respective logical storage device 301 and to a respective type of access permissions.

Once the associated logical and physical storage devices 301, 302 have been set up, the OS installer 107 is arranged to move the critical datasets 108 identified in the FIT 108 from the file system 303 of the OS 300 onto the physical storage devices 302 in dependence on the respective access permission types. The critical datasets 108 remain referenced in the file system 303 as indicated by the dashed outlines 108' in FIG. 3. The SAC 109 is then configured, separately to any configuration of the OS 300, with the access permissions data 304 for each physical storage device 302 for enforcement on subsequent requests for access to any of the critical datasets 108. The setup of the OS 300 is then completed before it is made available for use on the computer 102.

During the subsequent normal operation of the OS 300, any request for access to the critical datasets 108 is serviced by the file system 303 via the SAC 109. The SAC 109 is arranged to enforce the relevant access permissions for the critical dataset 108 that is subject to any such request. If the access requested in a given request is not compatible with the relevant access permissions data 304, the SAC 109 will refuse the request and report a permissions error to the file system 303.

In embodiments of the invention, since the enforcement of the access permissions for the selected datasets 108 is provided externally to the installed OS 300, even a compromised superuser or administrator account cannot provide unauthorized access to those selected datasets 108. For example, a compromised superuser or administrator account cannot perform write access to normally read only data such as password data or encryption key data.

Figure 4:
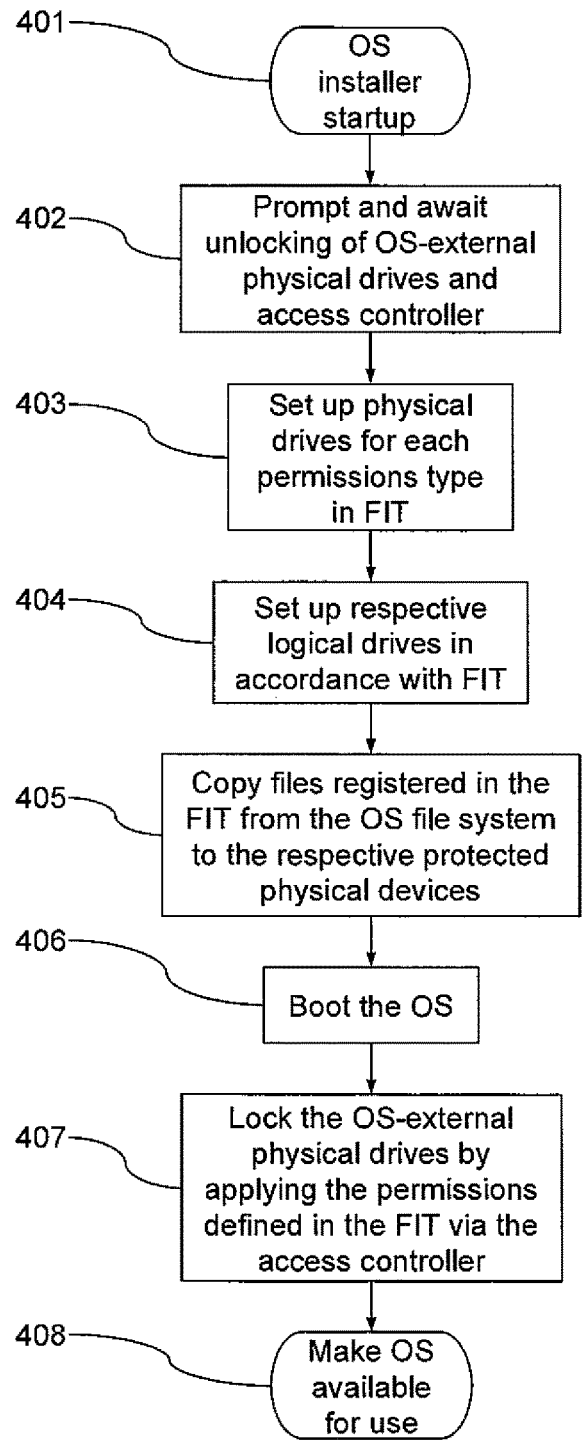
FIG. 4 is a flow chart illustrating the processing performed by the operating system installer of FIG. 1 when installing the operating system, in accordance with embodiments of the present invention.

The processing of the OS installer program 107 will now be described with reference to the flow chart of FIG. 4, in accordance with embodiments of the present invention. Processing is initiated at step 401 and proceeds to step 402 where the permission types 204 are identified, and the identification of the SAC 109 and associated physical storage devices 104 is prompted and once inputted processing moves to step 403. At step 403 a physical storage device 302 is selected for each of the permissions types identified in the FIT 110 and set up accordingly and processing then moves to step 404. At step 404 a set of logical drives (i.e., logical storage devices) are set up in the file system 303 of the OS 300 that, in the present embodiment, correspond with the logical drive data 205 in the FIT 110, and the logical storage devices respectively correspond to the datasets 108 and the physical storage devices 104, and processing moves to step 405. At step 405 the datasets 108 located by the respective paths 203 in the FIT 110 are moved or copied from the file system 303 to the respective physical storage devices 302 selected in step 403, and processing moves to step 406. In step 405, each dataset of L datasets 108 (FIG. 1) or 108' (FIG. 3) are stored on at least one physical storage device. For example in one embodiment, each dataset of the L datasets 108 is stored on a respective physical storage device 104 (FIG. 1) or 302 (FIG. 3). Each dataset of the L datasets is independently accessible in accordance with access permissions of N unique access permission types (e.g., ro, w1, r/w, wo in FIG. 2) respectively specific to each dataset. N is at least 2 and L≥N wherein N=4 in the embodiments of FIGS. 1-3. The SAC is software within the computer system 101 and is external to the operating system of the computer system.

At step 406 the processing of the OS installer 107 ends and the OS 300 is booted, including the logical and physical storage devices 301, 302, and performs any required configuration tasks before processing moves to step 407. At step 407 the access permissions 304 are set on the SAC 109 preventing any further unauthorized access to the critical datasets 108 and processing moves to step 408. Step 407 configures control of access to each dataset of the L datasets stored on the at least one physical storage device (e.g., on respective physical storage devices). The control of access is configured to enforce, by the SAC, the access permission of the unique permission type specific to each dataset. In one embodiment, the operating system is unable to provide the control of access to each dataset to which access permission is enforced by the SAC and which is stored on the respective physical storage device. At step 408 the OS 300 is made Once the OS installer has been set up with the secure externally controlled access permissions as described above, changes to the critical datasets 108, non-compliant with the permissions enforced in normal operation by the SAC, may only be made subsequently in controlled maintenance procedures during which the datasets are isolated from any possible unauthorized interference. During such maintenance procedures the access permissions are changed so as to enable any required maintenance on the critical data sets 108. Such maintenance procedures are performed externally to the OS 300. In other words, no changes to the critical datasets 108, non-compliant with the permissions enforced in normal operation by the SAC, and no changes to the access control functions of the SAC 109 are allowed at any time from within the OS 300 even during the controlled maintenance procedures.

Figure 5:
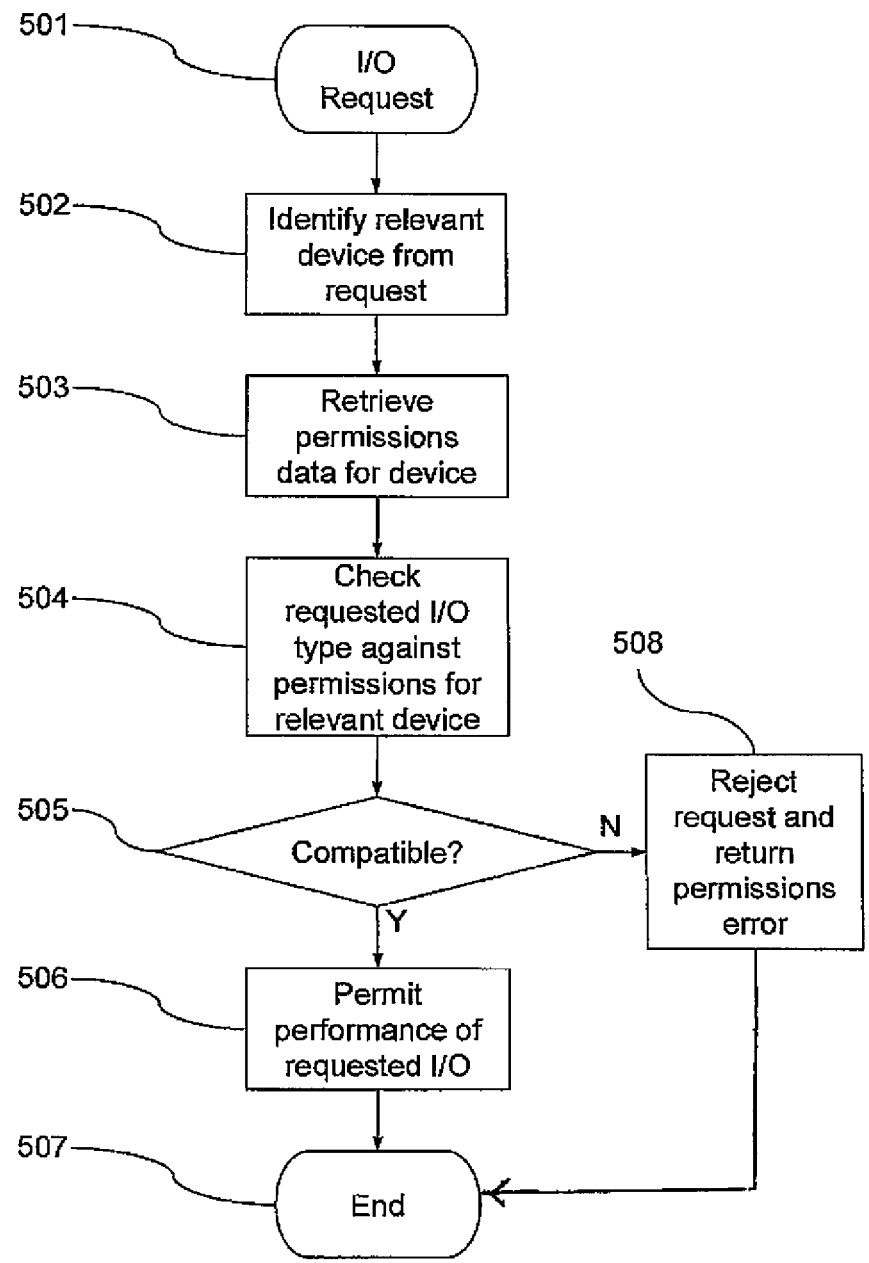
FIG. 5 is a flow chart illustrating the processing performed by a storage access controller in response to an access request from the operating system in use, in accordance with embodiments of the present invention.

The processing performed by the SAC 109 in response to a file access request from the OS 300 will now be described with reference to FIG. 5, in accordance with embodiments of the present invention. Processing is initiated at step 501 in response to the receipt of a request from the OS 300 to access one of the protected datasets 108 and processing then moves to step 502. At step 502 the relevant physical device 302 is identified from the received request from the attributes of the referenced dataset 108' in the file system 303 and processing moves to step 503. At step 503 the permissions 304 for the identified device 302 are retrieved by the SAC 109 and processing moves to step 504. At step 504 the request is compared by the SAC 109 to the permissions 304 for the relevant device and processing moves to step 505. If at step 505 the request is compatible with the relevant permissions 304 then processing moves to step 506. At step 506 the request is performed and processing then moves to step 507 and ends. If at step 505 the request is not compatible with the relevant permission 303 then processing moves to step 508. At step 508 the request is rejected and returned to the OS 300 with a permissions error. Processing then moves to step 507 and ends.

In another embodiment, the critical datasets are not stored by access permissions type. Instead, access permissions are applied at the file level. In this embodiment, the critical datasets may all be stored on one logical or physical device.

In a further embodiment, the FIT is provided for access by the OS during I/O requests for the critical datasets. The FIT will remain read only during the normal operation of the operating system. The read only property of the FIT may be achieved by storing the FIT on the read only storage device 302. The OS may use the FIT to perform a check of the critical dataset access permissions and refuse the request if it is not compatible. In this manner, only compatible requests are sent to SAC. If this pre-checking process is subverted the SAC check provides a backup. The FIT may also be used by the OS where a relevant dataset needs to be extended, to identify correct storage device for the new data. The FIT may also be used when a given critical dataset needs to be created so as to identify the correct storage device for the new critical dataset. Such runtime use of the FIT enables critical datasets created after installation to be provided with external access permissions control as described above.

In another embodiment the FIT comprises simple list of file names or file paths and associated access permissions. In a further embodiment, each relevant dataset in the FIT is identified by any other suitable specification such as a sub-tree in the registry. The FIT may omit any identification of logical storage devices. Instead, the OS installer may be arranged to apply a predetermined set of rules to set up a suitable set of logical and corresponding physical devices. The FIT may be modified by an authorized administrator only and only during the controlled maintenance period described above. As will be understood by those skilled in the art, the FIT may use other criteria for identifying the relevant critical datasets such as wild card matching or dataset ownership for example.

In another embodiment, an existing hypervisor or storage controller provides the access permissions control function. As will be understood by those skilled in the art, the access permissions control functions of the SAC may be provided in software, firmware or hardware or a combination thereof. The access permissions control functions may be provided at any point external to the relevant OS between the OS and the relevant storage devices. As will be understood by those skilled in the art, the SAC or the OS installer may be provided on different computers or provided as services over a network. As will be understood by those skilled in the art, the SAC may be provided externally to the computer on which the relevant OS operates.

Embodiments of the invention are likely to be of most benefit in the context of full-fledged multi-user operating systems (OS). The term OS is intended to be construed broadly. Embodiments of the invention may be applied to other computing environments, such as computerized machines running custom software, operating with external storage, where critical internal datasets might need to be protected from alteration from within the software during normal operation.

Embodiments of the invention can be used not only to help protect against intended attacks, for example, by malicious users, but also to help safeguard against a possible OS malfunction so as to preserve a safe state of the OS.

As will be understood by those skilled in the art, embodiments of the invention may be applied to any operating system where access permissions to some datasets may want to be secured. Embodiments of the invention may be applied to virtual machines, logical partitions (LPARs) or operating system running indirectly or directly on physical computing hardware. In the case of virtual machines, the access permissions control functions may be provided by the hypervisor running the virtual machine or by another hypervisor or I/O controller down the I/O path.

Embodiments of the invention enable the control of access to selected datasets such as OS critical resources, perhaps comprising security related data, to be functionally isolated from the OS. Thus in the event of the OS being compromised and at a user level capable of overriding access permissions within the OS, the access permissions for the critical resources of the OS are more like to remain secure or resist unauthorized alteration or overriding.

As will be understood by those skilled in the art, the OS datasets provided for installation on a given computer or other suitable hardware may be installed in a number of different ways in dependence on the given hardware or user selected options. Thus the arrangement of the OS datasets on the distribution media may vary significantly from their subsequent arrangement in a given instance of the OS when installed.

As will be understood by those skilled in the art, a program loader that may comprise part of the microcode of the relevant hardware and may also perform the tasks of an OS installer in some implementations.

As will be understood by those skilled in the art that the apparatus that embodies a part or all of the present invention may be a general purpose device comprising a processor, memory, input/output interfaces and having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

Figure 6:
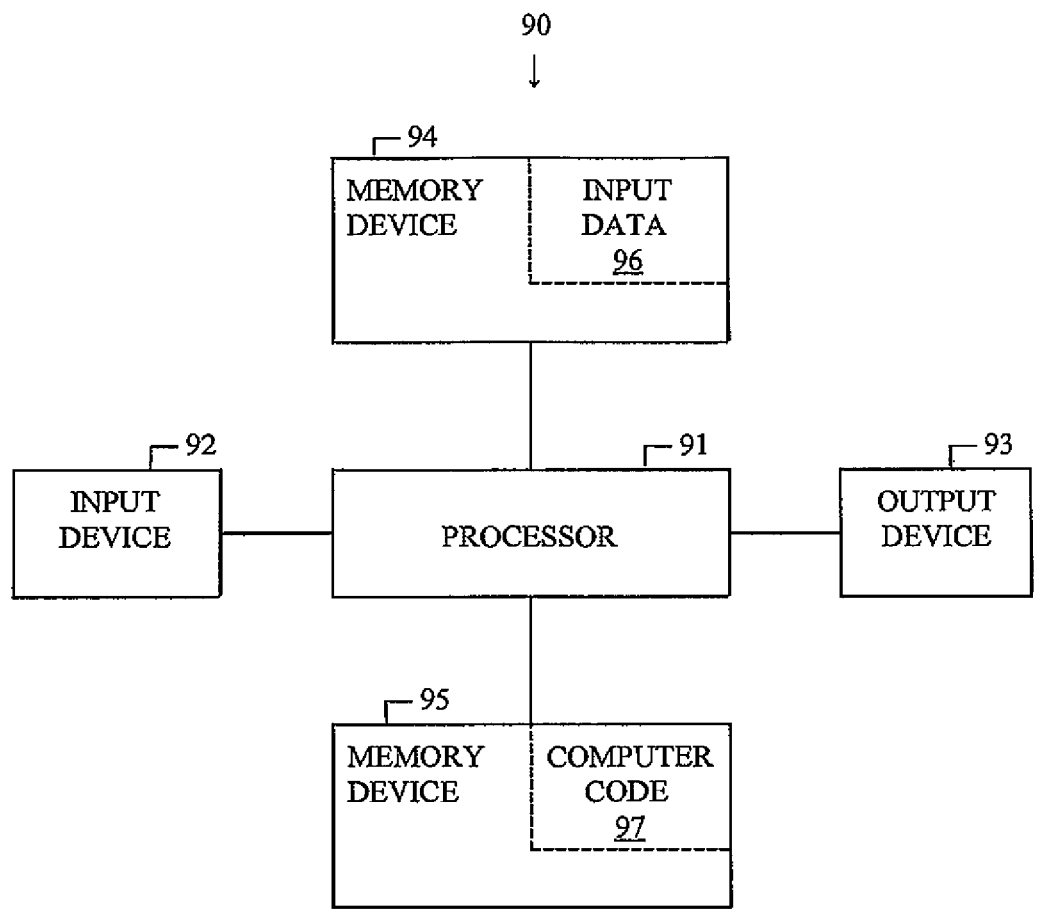
FIG. 6 illustrates a computer system used for implementing the methods of the present invention, in accordance with the embodiments of the present invention.

FIG. 6 illustrates a computer system used for implementing methods of the present invention, in accordance with the embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes computer program code 97 which is a computer program that comprises computer-executable instructions. The program code 97 includes software or program instructions that may implement methods of the present invention. The processor 91 executes the program code 97. The memory device 94 includes input data 96. The input data 96 includes input required by the program code 97. The output device 93 displays output from the program code 97. Either or both memory devices 94 and 95 (or one or more additional memory devices not shown in FIG. 6) may be used as a computer readable storage medium or device (or program storage device) having a computer readable program embodied therein and/or having other data stored therein, wherein the computer readable program comprises the program code 97. Generally, a computer program product (or, alternatively, an article of manufacture) of the computer system 90 may comprise said computer readable storage medium (or said program storage device). A computer readable storage device of the present invention, when storing the program code 97 for execution by one or more processors, is not a transmission medium such as a copper transmission cable, an optical transmission fiber, or a wireless transmission medium.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices. As another example, the processor 91 may represent one or more processors, and each memory device of memory devices 94 and 95 may represent one or more memory devices and/or one or more computer readable storage devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

What is claimed is:

1. A method for controlling access to data, said method comprising:

storing, by a processor of a computer system, via execution of a storage access controller (SAC), each dataset of L datasets on at least one physical storage device, wherein each dataset is independently accessible in accordance with an access permission type assigned to each dataset independently selected for each dataset from N unique access permission types, wherein N is at least 2 and L≥N, and wherein the SAC is software within the computer system and is external to an operating system of the computer system, wherein the L datasets and a file integrity table (FIT) are stored in a file system of the operating system, wherein the FIT comprises multiple rows and multiple columns, wherein each row and each column of the FIT intersect in a unique cell of the FIT, wherein each row of the FIT corresponds to a unique dataset of the L datasets, wherein the multiple columns of the FIT comprise a Filename column specifying a name of each dataset of the L datasets, a Path column specifying a path that locates each dataset of the L datasets in the file system, and an Access Permissions column specifying an access permission type assigned to each dataset of the L datasets, and wherein said storing each dataset comprises:

identifying, from the FIT, the permission type assigned to each dataset;

selecting, for each dataset, a physical storage device; and copying or moving each dataset located by the path specified in the FIT for each dataset from the file system to the selected physical storage device for each dataset; and after said storing, configuring, in the SAC, control of access to each dataset stored on the at least one physical storage device, said control of access configured to enforce, by the SAC, access to each dataset in accordance with the access permission type assigned to each dataset, wherein the operating system is unable to provide the control of access to each dataset to which access is enforced by the SAC in accordance with the access permission type assigned to each dataset and which is stored on the at least one physical storage device.

2. The method of claim 1, said method further comprising:

receiving, by the processor via execution of the SAC, a request from the operating system to access one dataset of the L datasets;

determining, by the processor via execution of the SAC, that the request is compatible with the access permission type assigned to the one dataset, and in response, granting, by the processor via execution of the SAC, the requested access.

3. The method of claim 1, wherein the multiple columns of the FIT further comprise a Logical Storage Device column specifying an identifier of a logical storage device associated with each dataset of the L datasets subject to each access permission type being assigned to a specific logical storage device.

4. The method of claim 3, wherein said storing each dataset further comprises:

forming, in the file system, the logical storage device for each logical storage device identifier in the FIT, which forms in the file system M logical storage devices, wherein M≥N.

5. The method of claim 4, wherein M=N.

6. The method of claim 5, wherein the at least one physical device consists of N physical devices, and wherein each physical device of the N physical devices corresponds to a respective logical storage device of the N logical storage devices and to a respective access permission type of the N unique access permission types.

7. The method of claim 1, wherein after said configuring control of access to each dataset stored on the at least one physical storage device, said method further comprising said operating system, via execution of the processor during normal operation of the operating system:

(i) receiving a request for access to one dataset of the L datasets and in response, using the FIT to determine the access permission type assigned to the one dataset;

(ii) granting the request if the operating system has determined, via said using the FIT, that the request is compatible with the determined access permission type of the one dataset;

(iii) rejecting the request if the operating system has determined, via said using the FIT, that the request is not compatible with the determined access permission type of the one dataset.

8. The method of claim 1, wherein after said configuring control of access to each dataset stored on at the least one physical storage device, said method further comprising said operating system, via execution of the processor during normal operation of the operating system:

using the FIT to determine a correct physical storage device of the at least one physical storage device for extending a dataset stored on the at least one physical storage device or for creating a new dataset to be stored on the at least one physical storage device.

9. The method of claim 1, wherein the at least one physical device consists of N physical devices, and wherein each physical device corresponds to a respective access permission type of the N unique access permission types.

10. The method of claim 1, wherein said configuring control of access comprises:

preventing the operating system from making changes to the L datasets and from controlling access of the L datasets.

11. The method of claim 1, wherein each dataset is relevant to a security, an integrity, or both the security and the integrity of the operating system.

12. The method of claim 1, wherein N is at least 4, and wherein the N unique access permission types include read only, write once, read and write, and write only.

13. A computer program product, comprising a computer readable storage (hardware) medium/device having a computer readable program code stored therein, said storage device not being a transitory signal, said program code containing instructions which, upon being executed by a processor of a computer system, implement a method for controlling access to data, said method comprising:

storing, by the processor of the computer system, via execution of a storage access controller (SAC), each dataset of L datasets on at least one physical storage device, wherein each dataset is independently accessible in accordance with an access permission type assigned to each dataset independently selected for each dataset from N unique access permission types, wherein N is at least 2 and L≥N, and wherein the SAC is software within the computer system and is external to an operating system of the computer system, wherein the L datasets and a file integrity table (FIT) are stored in a file system of the operating system, wherein the FIT comprises multiple rows and multiple columns, wherein each row and each column of the FIT intersect in a unique cell of the FIT, wherein each row of the FIT corresponds to a unique dataset of the L datasets, wherein the multiple columns of the FIT comprise a Filename column specifying a name of each dataset of the L datasets, a Path column specifying a path that locates each dataset of the L datasets in the file system, and an Access Permissions column specifying an access permission type assigned to each dataset of the L datasets, and wherein said storing each dataset comprises:

identifying, from the FIT, the permission type assigned to each dataset;

selecting, for each dataset, a physical storage device; and copying or moving each dataset located by the path in the FIT for each dataset from the file system to the selected respective physical storage device for each dataset; and after said storing, configuring, in the SAC, control of access to each dataset stored on the at least one physical storage device, said control of access configured to enforce, by the SAC, access to each dataset in accordance with the access permission type assigned to each dataset, wherein the operating system is unable to provide the control of access to each dataset to which access is enforced by the SAC in accordance with the access permission type assigned to each dataset and which is stored on the at least one physical storage device.

14. The computer program product of claim 13, wherein the multiple columns of the FIT further comprise a Logical Storage Device column specifying an identifier of a logical storage device associated with each dataset of the L datasets subject to each access permission type being assigned to a specific logical storage device.

15. The computer program product of claim 14, wherein said storing each dataset further comprises:

forming, in the file system, the logical storage device for each logical storage device identifier in the FIT, which forms in the file system M logical storage devices, wherein M≥N.

16. The computer program product of claim 13, wherein said configuring control of access comprises:

preventing the operating system from making changes to the L datasets and from controlling access of the L datasets.

17. A computer system comprising a processor, a memory coupled to the processor, and a computer readable storage device coupled to the processor, said storage device containing program code which, upon being executed by the processor via the memory, implements a method for controlling access to data, said method comprising:

storing, by the processor of the computer system, via execution of a storage access controller (SAC), each dataset of L datasets on at least one physical storage device, wherein each dataset is independently accessible in accordance with an access permission type assigned to each dataset independently selected for each dataset from N unique access permission types, wherein N is at least 2 and L≥N, and wherein the SAC is software within the computer system and is external to an operating system of the computer system, wherein the L datasets and a file integrity table (FIT) are stored in a file system of the operating system, wherein the FIT comprises multiple rows and multiple columns, wherein each row and each column of the FIT intersect in a unique cell of the FIT, wherein each row of the FIT corresponds to a unique dataset of the L datasets, wherein the multiple columns of the FIT comprise a Filename column specifying a name of each dataset of the L datasets, a Path column specifying a path that locates each dataset of the L datasets in the file system, and an Access Permissions column specifying an access permission type assigned to each dataset of the L datasets, and wherein said storing each dataset comprises:

identifying, from the FIT, the permission type assigned to each dataset;

selecting, for each dataset, a physical storage device; and copying or moving each dataset located by the path in the FIT for each dataset from the file system to the selected respective physical storage device for each dataset; and after said storing, configuring, in the SAC, control of access to each dataset stored on the at least one physical storage device, said control of access configured to enforce, by the SAC, access to each dataset in accordance with the access permission type assigned to each dataset, wherein the operating system is unable to provide the control of access to each dataset to which access is enforced by the SAC in accordance with the access permission type assigned to each dataset and which is stored on the at least one physical storage device.

18. The computer system of claim 17, wherein the multiple columns of the FIT further comprise a Logical Storage Device column specifying an identifier of a logical storage device associated with each dataset of the L datasets subject to each access permission type being assigned to a specific logical storage device.

19. The computer system of claim 18, wherein said storing each dataset further comprises:

forming, in the file system, the logical storage device for each logical storage device identifier in the FIT, which forms in the file system M logical storage devices, wherein M≥N.

20. The computer system of claim 17, wherein said configuring control of access comprises:

preventing the operating system from making changes to the L datasets and from controlling access of the L datasets.

* * * * *